US00RE42528E

(19) United States
(12) Reissued Patent
Huang et al.

(10) Patent Number: US RE42,528 E
(45) Date of Reissued Patent: Jul. 5, 2011

(54) END-OF-SCAN REPORTING SYSTEM

(75) Inventors: Yin-Chun Huang, Hsinchu (TW); Shih-Zheng Kuo, Taipei County (TW)

(73) Assignee: Transpacific Systems, LLC, Wilmington, DE (US)

(21) Appl. No.: 11/866,978

(22) Filed: Oct. 3, 2007

Related U.S. Patent Documents

Reissue of:

(64) Patent No.: 6,615,290
Issued: Sep. 2, 2003
Appl. No.: 09/478,861
Filed: Jan. 7, 2000

U.S. Applications:

(63) Continuation of application No. 11/219,299, filed on Sep. 2, 2005, now Pat. No. Re. 40,306.

(51) Int. Cl.
*G06F 3/00* (2006.01)
*G06F 13/00* (2006.01)
*G06F 7/38* (2006.01)

(52) U.S. Cl. ..... 710/18; 710/5; 710/31; 712/225

(58) Field of Classification Search ..... None
See application file for complete search history.

(56) References Cited

U.S. PATENT DOCUMENTS

| | | | | |
|---|---|---|---|---|
| 5,229,866 | A | 7/1993 | Kashiwagi et al. | |
| 5,315,640 | A | 5/1994 | Takayama et al. | |
| 5,317,628 | A * | 5/1994 | Misholi et al. | 379/88.14 |
| 5,434,650 | A * | 7/1995 | Nakahara et al. | 399/8 |
| 5,463,476 | A | 10/1995 | Oya | |
| 5,511,220 | A | 4/1996 | Perlman | |
| 5,532,841 | A | 7/1996 | Nakajima et al. | |
| 5,652,746 | A | 7/1997 | Heiman | |
| 6,104,922 | A | 8/2000 | Baumann | |
| 6,108,462 | A | 8/2000 | Aoki et al. | |
| 6,115,739 | A | 9/2000 | Ogawa et al. | |
| 6,144,848 | A | 11/2000 | Walsh et al. | |
| 6,208,436 | B1 * | 3/2001 | Cunningham | 358/474 |
| 6,289,371 | B1 | 9/2001 | Kumpf et al. | |
| 6,354,499 | B2 | 3/2002 | Matsueda et al. | |
| 6,501,724 | B2 | 12/2002 | Lee et al. | |
| 6,721,059 | B1 | 4/2004 | Sturgeon et al. | |
| 2005/0044172 | A1 | 2/2005 | Philyaw | |

* cited by examiner

*Primary Examiner* — Alan Chen
(74) *Attorney, Agent, or Firm* — Stolowitz Ford Cowger LLP

(57) ABSTRACT

A reporting system capable of reporting the end of a scanning session to a user through existing computer peripheral devices is proposed. By reporting at the end of a scanning session, the user can proceed with subsequent scanning operations with no delay. Hence, idle time of the scanner is greatly reduced.

27 Claims, 1 Drawing Sheet

END-OF-SCAN REPORTING SYSTEM

Matter enclosed in heavy brackets [ ] appears in the original patent but forms no part of this reissue specification; matter printed in italics indicates the additions made by reissue.

*This application is a continuation application of reissue application Ser. No. 11/219,229, filed Sep. 2, 2005 now U.S. Pat. No. RE. 40,306 that claims priority to Ser. No. 09/478, 861, filed Jan. 7, 2000 and issued at U.S. Pat. No. 6,615,290.*

BACKGROUND OF THE INVENTION

1. Field of the Invention

The present invention relates to an end-of-scan reporting system. More particularly, the present invention relates to a system that reports the completion of a scanning session to a user through computer peripheral components.

2. Description of the Related Art

Due to progress in multi-media technologies, advanced image processing techniques have lead to the development of many peripheral image processors. A scanner is one of the imaging processors that have recently become an indispensable piece of equipment. Developed from earlier versions of the black-and-white palm top scanner, full color high-resolution scanners capable of producing fine real images are widespread nowadays.

Currently, most scanners in the market have a user interface capable of reporting to the user as soon as a scanning session is complete so that the user can plan the next task. In general, when a picture or document is being scanned, a user must watch for the end of the scanning session. As soon as a scanning session is complete, a scan completion icon appears on a computer screen through the user interface. Next, the user has to replace the page with a new one and then watch the computer screen again to find out when the scanning session ends. This type of operation is likely to prevent the user from performing other tasks. Alternatively, if the user spends time doing other asks, the user may miss the end of session notice displayed on the computer screen and leave the scanner in an idle state. Hence, the current method of operating the scanner is quite inconvenient.

Some higher-grade scanners now include an automatic document feeder (ADF) so that the user can put a number of pages into a tray and extend each scanning session. At the end of the multi-paper scanning session, an end-of-scanning icon is similarly displayed on the computer screen through the user interface so that the user is notified. However, if the user is occupied with some other tasks at that time, the end-of-scan notice may be missed. Hence, the scanner will still be left in an idle state for quite some time.

SUMMARY OF THE INVENTION

The invention provides a method of reporting the end of a scanning session to a user. The method includes determining the types of peripheral devices needed to report to the user at the end of a scanning session. When the current scanning task is complete, the selected peripheral devices automatically informs the user of the end of the scanning session.

This invention also provides a method of reporting the end of a scanning session to a user. The method includes using a computer to detect all the available peripheral devices for reporting the end of a scanning session. The most suitable peripheral device or devices for reporting end of scanning session to the user are then chosen. After the current scanning session is complete, the end of session notice is signaled to the user via the selected peripheral devices. Next, the computer decides if there is any further scanning task to perform. If there is any other scanning task to perform, the most suitable peripheral device or devices for reporting the end of a scanning session to the user is again chosen. If no more tasks are pending, the reporting system halts.

Accordingly, the present invention is to provide a reporting system capable of notifying a user of the end of a scanning session through computer peripheral devices. In addition, the invention is to provide a method of reporting the end of a scanning session to a user in real time so that subsequent scanning operations can proceed immediately with no delays. Hence, idle time of the scanner is greatly reduced.

It is to be understood that both the foregoing general description and the following detailed description are exemplary, and are intended to provide further explanation of the invention as claimed.

BRIEF DESCRIPTION OF THE DRAWING

The accompanying drawing is included to provide a further understanding of the invention, and is incorporated in and constitutes a part of this specification. The drawing illustrates embodiments of the invention and, together with the description, serves to explain the principles of the invention. In the drawing.

DESCRIPTION OF THE PREFERRED EMBODIMENTS

Figure 1:
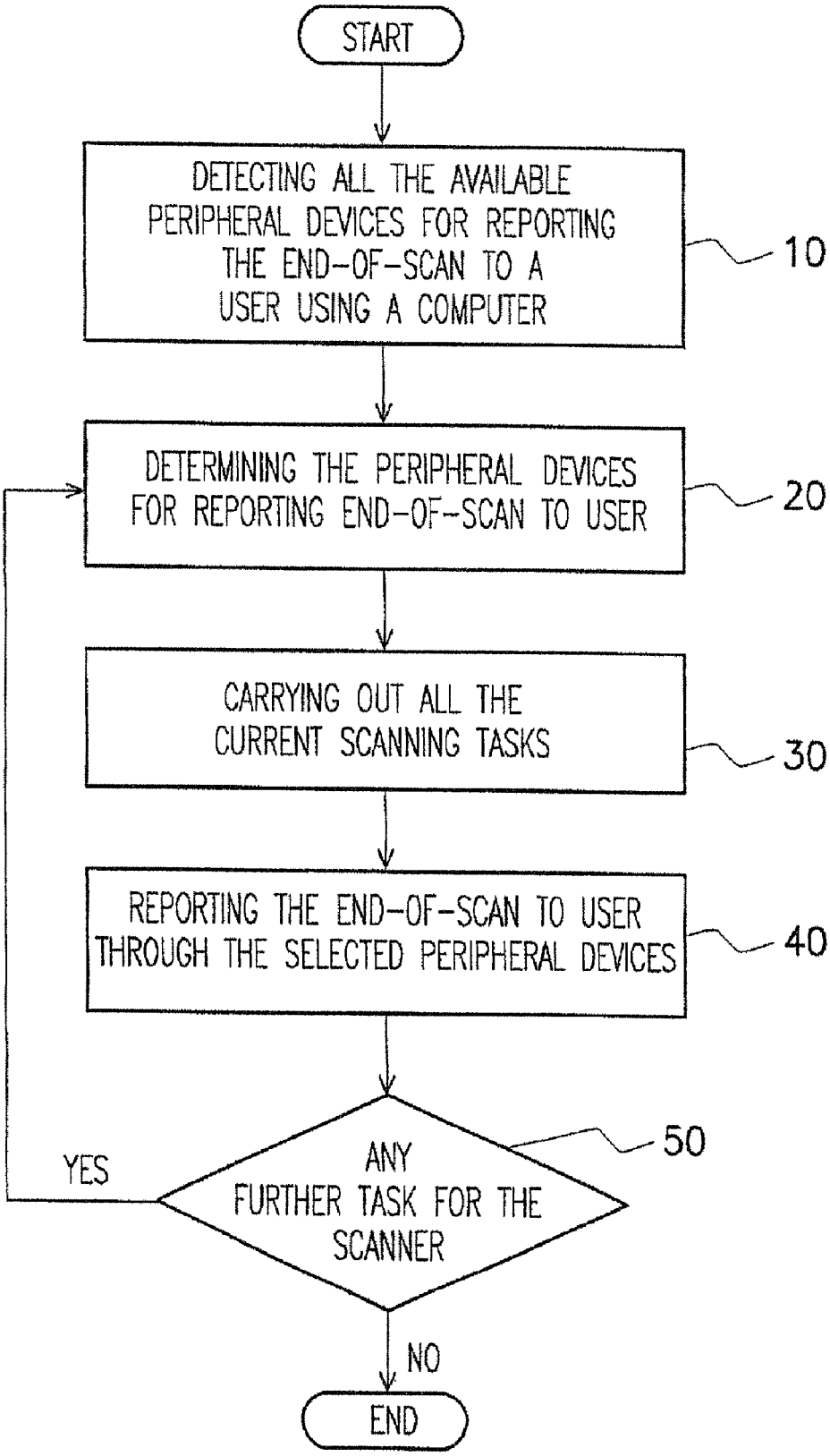
FIG. 1 is a flow chart showing the steps carried out in an end-of-scanning reporting system according to this invention.

Reference will now be made in detail to the present preferred embodiments of the invention, examples of which are illustrated in the accompanying drawing. Wherever possible, the same reference numbers are used in the drawings and the description to refer to the same or like parts.

The end-of-scan reporting system in this invention is achieved by appending application programs to the user interface program of a scanner. When the user interface picks up an end-of-scan signal from the scanner, an end-of-scan icon will be displayed on the computer screen as before. However, the system is also capable of reporting the end of scanning session to a user through a user-defined peripheral device or devices so that the user can continue or terminate the scanning task immediately. Hence, machine idle time is reduced.

The peripheral devices for reporting the end of a scanning session to a user can be a sound card capable of emitting a sound, the loudspeaker inside a computer system, a network card inside a computer system capable of sending electronic mail to a user's mailbox, or a data recorder capable of dialing a user's telephone number, pager number or mobile telephone number.

FIG. 1 is a flow chart showing the steps carried out in an end-of-scanning reporting system according to this invention. In step 10, before a user begins some scanning task, the computer makes a quick search for all the peripheral devices available for reporting end-of-scan to the user. The purpose of making such a search is to ensure that the desired reporting device or devices are present. In step 20, a suitable peripheral device or devices for reporting the end of scanning session are selected. In general, the most convenient method of reporting is chosen. For example, sound may be broadcast from a sound card or from the on-board computer loudspeaker. Alternatively, the end of scanning notice may be e-mailed to a pre-specified user mailbox. In some cases, a digital data recorder may be used to dial a telephone number, a mobile telephone number or a pager number to notify the user. The scanning task is conducted in step 30. The scanning task includes scanning a single page or a number of pages using an automatic paper feeder. After the scanning operation, the preselected peripheral device or devices are activated to report the end of a scanning session in step 40. After reporting the end of a scanning session, the system must make a conditioned return. In step 50, the system detects whether there is a scanning task waiting. If there is a scanning task pending, the system jumps back to step 20 where the available peripheral devices are again detected. Otherwise, if no scanning task is waiting, the system terminates.

In summary, one major advantage of this invention is the utilization of existing peripheral devices to report the end of a scanning session to a user. Through the notification made by the peripheral devices, the user is able to activate the next scanning task quickly so that idle time of the scanner is greatly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

[1. A method of reporting an end of a scanning session to a user, comprising the steps of:

selecting a peripheral device capable of reporting the end of a scanning session to the user; and notifying the user through the selected peripheral device after a series of scanning tasks has ended.]

[2. The method of claim 1, wherein the peripheral device includes a sound card capable of emitting sound.]

[3. The method of claim 1, wherein the peripheral device includes a loudspeaker installed inside a computer.]

[4. The method of claim 1, wherein the peripheral device includes a network card capable of transmitting electronic mail to a mailbox of the user.]

[5. The method of claim 1, wherein the peripheral device includes a digital data recorder capable of dialing a telephone number.]

[6. The method of claim 1, wherein the peripheral device includes a digital data recorder capable of dialing a pager number.]

[7. The method of claim 1, wherein the peripheral device includes a digital data recorder capable of dialing a mobile telephone number.]

[8. A method of reporting an end of a scanning session to a user, comprising the steps of:

using a computer to detect how many peripheral devices are available for reporting the end of a scanning session to the user;

selecting at least a peripheral device to report the end of a scanning session to the user;

performing all scanning tasks in a scanning session;

notifying the user, through the selected peripheral device, that a series of scanning tasks has ended; and determining if a scanning operation is waiting, wherein if a scanning operation is waiting, the method jumps to the step of selecting the peripheral device, and if no scanning operation is waiting, the scanning operation is terminated.]

[9. The method of claim 8, wherein the peripheral device includes a sound card capable of emitting sound.]

[10. The method of claim 8, wherein the peripheral device includes a loudspeaker installed inside a computer.]

[11. The method of claim 8, wherein the peripheral device includes a network card capable of transmitting electronic mail to a mailbox of a user.]

[12. The method of claim 8, wherein the peripheral device includes a digital data recorder capable of dialing a telephone number.]

[13. The method of claim 8, wherein the peripheral device includes a digital data recorder capable of dialing a pager number.]

[14. The method of claim 8, wherein the peripheral device includes a digital data recorder capable of dialing a mobile telephone number.]

*15. A method of reporting an end of a scanning session, comprising*

*receiving an input at a user interface for a scanner, the input selecting at least one notification from among multiple different types of notification available for reporting completion of the scanning session, and wherein the multiple different types of notification are provided by local peripheral devices that are each coupled to the scanner;*

*responsive to receiving the input at the user interface, initiating the scanner to execute one or more scanning tasks for the scanning session;*

*receiving a local end-of-scan signal from the scanner after the scanner completes the one or more scanning tasks; and*

*responsive to receiving the local end-of-scan signal, activating at least one of the local peripheral devices to provide the notification selected by the input for reporting the completion of the scanning session.*

*16. The method of claim 15, further comprising:*

*controlling the user interface for the scanner with a user interface program;*

*controlling activation of the local peripheral devices with one or more application programs; and*

*executing the user interface program together with the one or more application programs.*

*17. A method of reporting an end of a scanning session, comprising:*

*receiving an input at a user interface for a scanner, the input selecting at least one notification from among multiple different types of notification available for reporting completion of the scanning session, and wherein the multiple different types of notification are provided by local peripheral devices that are each coupled to the scanner;*

*responsive to receiving the input at the user interface, initiating the scanner to execute one or more scanning tasks for the scanning session;*

*receiving a local end-of-scan signal from the scanner after the scanner completes the one or more scanning tasks;*

*responsive to receiving the local end-of-scan signal, activating at least one of the local peripheral devices to provide the notification selected by the input for reporting the completion of the scanning session;*

*identifying pending scanning tasks while activating the at least one of the local peripheral devices;*

*receiving a new input at the user interface selecting a different notification from among the multiple different types of notification for reporting completion of the pending scanning tasks;*

*responsive to receiving the new input, initiating the scanner to execute the pending scanning tasks; and*

*activating one of the local peripheral devices to provide the different notification selected by the new input.*

*18. A method of reporting an end of a scanning session, comprising:*

*receiving an input at a user interface for a scanner, the input selecting at least one notification from among multiple different types of notification available for reporting completion of the scanning session, and wherein the multiple different types of notification are provided by local peripheral devices that are each coupled to the scanner;*

*responsive to receiving the input at the user interface, initiating the scanner to execute one or more scanning tasks for the scanning session;*

*receiving a local end-of-scan signal from the scanner after the scanner completes the one or more scanning tasks;*

*responsive to receiving the local end-of-scan signal, activating two of the local peripheral devices at the same time to provide the notification selected by the input for reporting the completion of the scanning session, wherein the two local peripheral devices are configured to provide two different types of notification reporting completion of the scanning session.*

*19. The method of claim 18, wherein a first activated one of the local peripheral devices is configured to provide a local notification directly from the scanner and a second activated one of the local peripheral devices is configured to send a remote notification to a location remote from the scanner.*

*20. The method of claim 15, wherein the local peripheral devices are each directly coupled to the scanner.*

*21. The method of claim 15, wherein one of the local peripheral devices comprises a digital data recorder configured to dial a mobile telephone number.*

*22. The method of claim 15, further comprising directing the notification selected by the input to a same user initiating the input.*

*23. The method according to claim 18 wherein a first activated one of the local peripheral devices is configured to provide an audio notification and a second activated one of the local peripheral devices is configured to provide a displayed notification.*

*24. The method of claim 15 further comprising monitoring for the local end-of-scan signal while the scanner executes the scanning tasks.*

*25. A method of reporting an end of a scanning session, comprising:*

*receiving an input at a user interface for a scanner, the input selecting at least one notification from among multiple different types of notification available for reporting completion of the scanning session, and wherein the multiple different types of notification are provided by local peripheral devices that are each coupled to the scanner;*

*responsive to receiving the input at the user interface, initiating the scanner to execute one or more scanning tasks for the scanning session;*

*receiving a local end-of-scan signal from the scanner after the scanner completes the one or more scanning tasks;*

*responsive to receiving the local end-of-scan signal, activating at least one of the local peripheral devices to provide the notification selected by the input for reporting the completion of the scanning session;*

*identifying pending scanning tasks; and*

*selectively executing the pending scanning tasks after receiving an additional input from the user interface.*

*26. The method according to claim 15 further comprising activating the local peripheral devices in real time as soon as the scanner completes the one or more scanning tasks.*

*27. An apparatus, comprising:*

*a computer system configured to:*

*identify different types of notifications and receive an input selecting one or more of the different types of notifications; and*

*initiate a scanning operation responsive to receiving the input and activate the one or more different types of notifications selected by the input responsive to receiving an end-of-scan signal indicating the scanning operation is completed.*

*28. An apparatus, comprising:*

*a computer system configured to:*

*identify different types of notifications and receive an input selecting one or more of the different types of notifications; and*

*initiate a scanning operation responsive to receiving the input and activate the one or more different types of notifications selected by the input responsive to receiving an end-of-scan signal indicating the scanning operation is completed, wherein the computer system is further configured to:*

*identify pending scanning tasks remaining after the scanning operation is completed;*

*identify a new input selecting one or more of the different types of notifications; and*

*activate the one or more different types of notifications selected by the new input responsive to receiving another end-of-scan signal indicating the pending scanning tasks are completed.*

*29. The apparatus of claim 27 further comprising at least one local peripheral device coupled directly to a scanner, wherein the scanner is configured to perform the scanning operation.*

*30. The apparatus of claim 29 wherein the computer system comprises a user interface configured to control the scanner and select the different types of notifications.*

*31. The apparatus of claim 29 further comprising a first local peripheral device configured to generate a local notification directly from the scanner, and a second local peripheral device configured to generate a remote notification remote from the scanner.*

*32. A method, comprising:*

*receiving an input with a computer, wherein the input selects at least one notification device from among multiple different notification devices, and wherein each of the multiple different notification devices is coupled to the computer and each configured to generate a different type of notification for reporting an end of a scanning session;*

*initiating the scanning session with the computer when the computer receives the input;*

*monitoring the scanning session with the computer; and*

*activating the notification device with the computer when the end of the scanning session is detected by the computer.*

*33. The method of claim 32 further comprising activating the notification device with the computer responsive to an end-of-scan signal received from a scanner.*

*34. A method, comprising:*

*receiving an input with a computer, wherein the input selects at least one notification device from among multiple different notification devices, and wherein each of the multiple different notification devices is coupled to*

*the computer and each configured to generate a different type of notification for reporting an end of a scanning session;*

*initiating the scanning session with the computer when the computer receives the input;*

*monitoring the scanning session with the computer;*

*activating a first one of the notification devices when a first scanning task for the scanning session has completed;*

*continuing the scanning session when a second scanning task for the scanning session is pending; and*

*activating a second one of the notification devices when the second scanning task for the scanning session has completed.*

*35. An article of manufacture including a computer-readable medium having instructions stored thereon that, in response to execution by a computing device, cause the computing device to perform operations comprising:*

*receiving an input selecting one or more different types of local peripheral devices, wherein each of the different types of local peripheral devices is configured to provide a different type of notification for reporting an end of a scanning session;*

*initiating the scanning session responsive to receiving the input;*

*determining when one or more scanning tasks for the scanning session have ended; and*

*activating the local peripheral devices selected by the input when the one or more scanning tasks for the scanning session have ended.*

*36. The article of manufacture of claim 35 wherein the local peripheral devices, when activated, provide notification that the scanning session has ended to a same user entering the input.*

*37. An article of manufacture including a computer-readable medium having instructions stored thereon that, in response to execution by a computing device, cause the computing device to perform operations comprising:*

*receiving an input selecting one or more different types of local peripheral devices, wherein each of the different types of local peripheral devices is configured to provide a different type of notification for reporting an end of a scanning session;*

*initiating the scanning session responsive to receiving the input;*

*determining when one or more scanning tasks for the scanning session have ended; and*

*activating two of the local peripheral devices at the same time when the one or more scanning tasks for the scanning session have ended, wherein a first activated one of the local peripheral devices comprises an audio device and a second activated one of the local peripheral devices comprises a data display device.*

*38. A scanner, comprising:*

*a user interface configured to select between different types of notification devices for reporting an end of a scanning session, wherein each of the different types of notification devices generates a different type of notification for reporting the end of the scanning session; and*

*a computer coupled to the user interface and the notification devices, wherein the computer is configured to report the end of the scanning session to the user interface and activate the notification devices selected by the user interface to report the end of the scanning session.*

*39. The scanner of claim 38 wherein a first one of the notification devices is configured to provide a local notification from the computer and a second one of the notification devices is configured to send a remote notification to a location remote from the computer.*

*40. A scanner, comprising:*

*a user interface configured to select between different types of notification devices for reporting an end of a scanning session, wherein each of the different types of notification devices generates a different type of notification for reporting the end of the scanning session; and*

*a computer coupled to the user interface and the notification devices, wherein the computer is configured to report the end of the scanning session to the user interface and activate the notification devices selected by the user interface to report the end of the scanning session, wherein:*

*the computer is further configured to identify pending scanning tasks after the end of the scanning session; and*

*the user interface is further configured to select a different one of the notification devices for reporting an end of the pending scanning tasks.*

*41. The scanner of claim 38 wherein the computer is further configured to initiate and control the scanning session.*

* * * * *

UNITED STATES PATENT AND TRADEMARK OFFICE

CERTIFICATE OF CORRECTION

PATENT NO. : RE42,528 E
APPLICATION NO. : 11/866978
DATED : July 5, 2011
INVENTOR(S) : Huang et al.

It is certified that error appears in the above-identified patent and that said Letters Patent is hereby corrected as shown below:

Column 4, line 19, in Claim 15, delete "*comprising*" and insert -- *comprising:* --.

Signed and Sealed this
Twenty-second Day of November, 2011

David J. Kappos

David J. Kappos
*Director of the United States Patent and Trademark Office*